April 8, 1969

C. M. LENNY 3,437,897

AXIAL AIR GAP ELECTRIC MOTOR SYSTEM WITH PERMANENT
MAGNET DISC ROTOR

Filed June 8, 1966

INVENTOR.
CHARLES M. LENNY
BY
Merchant & Gould
ATTORNEYS

INVENTOR.
CHARLES M. LENNY
BY
Merchant & Gould
ATTORNEYS

United States Patent Office 3,437,897
Patented Apr. 8, 1969

3,437,897
AXIAL AIR GAP ELECTRIC MOTOR SYSTEM WITH PERMANENT MAGNET DISC ROTOR
Charles M. Lenny, 839 W. Hoyt Ave.,
St. Paul, Minn. 55117
Filed June 8, 1966, Ser. No. 556,100
Int. Cl. H02p 5/06, 5/28; H02k 29/00
U.S. Cl. 318—138                8 Claims

ABSTRACT OF THE DISCLOSURE

A motor having first and second frameworks of magnetic material each constructed so as to be generally toroidal in shape with alternating poles positioned along one surface thereof and a coil wound inside thereof, situated adjacent a magnetized disc rotor so as to be axially spaced therefrom at either side thereof and means for energizing the coils so that the poles of the first and second frameworks alternate to drive the rotor. For operation on direct current the energizing means may comprise a commutator with spark suppressors or transistorized commutating circuitry with rotor position pickup coils. For operation on alternating current the means may comprise SCR commutating circuitry.

---

This invention pertains to an electric motor of the disk type and more specifically to an electric motor that includes a rotor and a pair of stator structures disposed on either side of the rotor to form axial air gaps therebetween which structures cooperate to produce a rotating magnetic field to drive the rotor.

In the disclosed embodiment of the present invention a pair of toroidal shaped coils are each mounted within a generally toroidal shaped hollow framework composed of magnetic material which provides a magnetic flux path around the coil contained therein. This flux path contains poles which are oppositely polarized by flux passing therethrough and which are spaced apart about the axis of the framework. One of the coils and the associated framework is mounted adjacent the rotor at one side while the other coil and framework is mounted adjacent the rotor on the other side. The poles in the first framework are displaced about the axis of the rotor from the poles of the second framework and the coils are sequentially energized to provide an effective rotating magnetic field. The rotor is positioned in the rotating magnetic field so that a torque is produced thereon. Several embodiments are disclosed for sequentially energizing the coils of the stator.

It is an object of the present invention to provide a new and improved electric motor.

It is a further object of the present invention to provide a motor having a new and novel stator assembly.

It is a further object of the present invention to provide an electric motor which is relatively simple and inexpensive to construct.

It is a further object of the present invention to provide an electric motor which can be connected to operate on a variety of electrical supplies including direct current and alternating current.

These and other objects of this invention will become apparent to those skilled in the art upon consideration of the accompanying specification, claims, and drawings.

Referring to the drawings wherein like characters indicate like parts throughout the figures.

Figure 2:
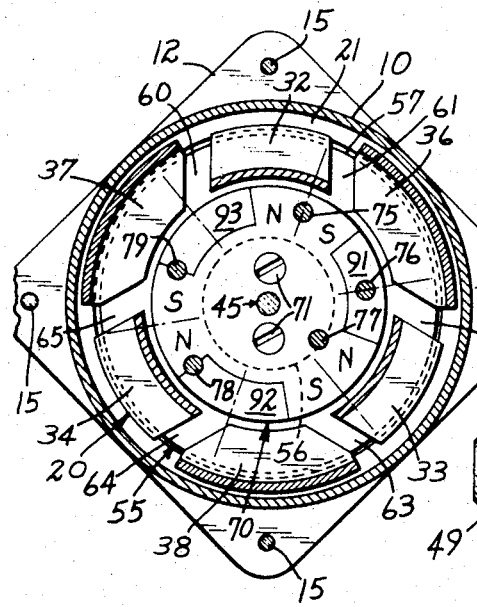
FIG. 2 is a sectional view, somewhat diminished in size, as seen from the line 2—2 in FIG. 1.
Figure 3:
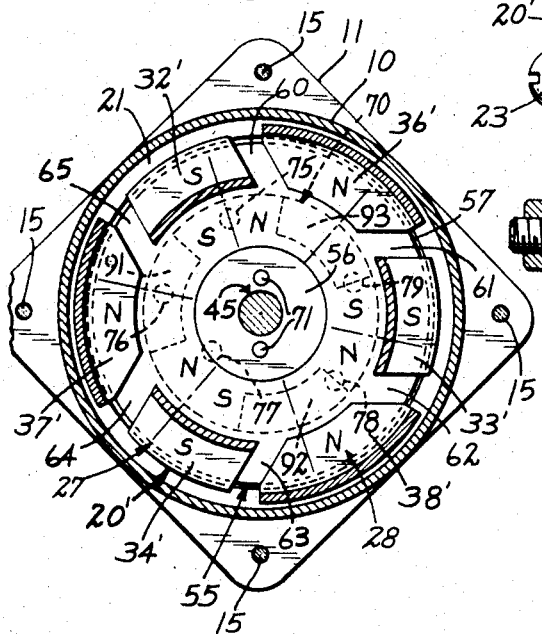
FIG. 3 is a sectional view, somewhat diminished in size, as seen from the line 3—3 in FIG. 1.

The numeral 10 designates a hollow cylindrical housing having end plates 11 and 12 fixedly attached at either end thereof. Each of the end plates 11 and 12 have a cylindrical shaped flange 13 and 14, respectively, projecting axially outwardly from the inner surface thereof with an outside diameter slightly smaller than the inside diameter of the cylindrical housing 10. Thus, the housing 10 fits over the flanges 13 and 14 of the end plates 11 and 12. The end plates 11 and 12 are generally rectangularly shaped, as illustrated in FIGS. 2 and 3, and are held fixedly in place over the ends of the housing 10 by bolts 15 engaged through the corners thereof.

The end plate 11 has a stator assembly generally designated 20 attached to the inner surface thereof by some means such as screws 22 and the end plate 12 has a stator assembly generally designated 20′ attached to the inner surface thereof by some means such as screws 23. In this embodiment the stator assembly 20 is substantially similar to the stator assembly 20′ but it should be understood that these assemblies might deviate substantially in similarity and still come within the scope of this invention. A hollow cylindrical non-magnetic spacer 21, having an outside diameter approximately equal to the inside diameter of the housing 10 is positioned between the stator assemblies 20 and 20′ to maintain the correct spacing therebetween. However, it should be understood that the spacer 21 is not necessary and may be eliminated if the various parts are constructed within a predetermined tolerance.

Figure 5:
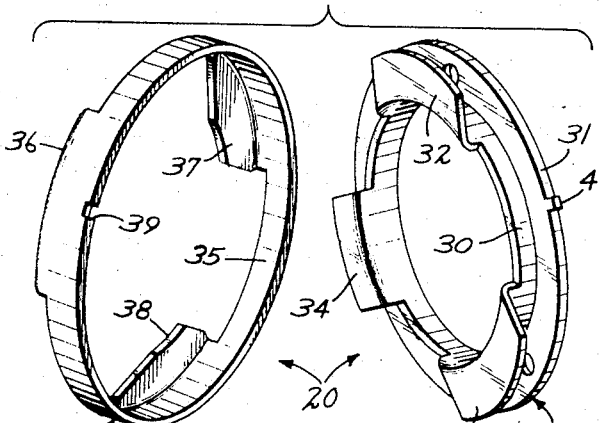
FIG. 5 is an exploded view of a stator framework as illustrated in FIG. 4.
Figure 4:
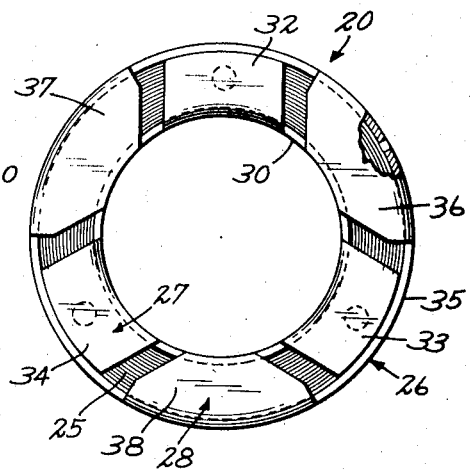
FIG. 4 is a detailed view of a stator assembly for the electric motor.

Referring to FIGS. 4 and 5 it can be seen that the stator assembly 20 includes a substantially toroidal shaped coil 25 contained within a hollow generally toroidal shaped framework 26. Framework 26 is comprised of a magnetic material which provides a path for the flux produced by the coil 25 when it is properly energized. Referring to FIG. 5 the framework 26 includes two members 27 and 28 which are fixedly engaged by press fitting or the like to provide the framework 26. The member 27 has a central cylindrical portion 30 with a circumferential flange 31 extending radially outwardly from one end thereof. Portions of a circumferential, radially outwardly extending flange at the other end of the cylinder 30 are removed leaving three spaced apart radially outwardly extending portions 32, 33 and 34, which form magnetic poles in the electric motor and will be referred to as magnetic poles throughout the remainder of this specification. Thus, the member 27 forms a winding bobbin upon which the coil 25 can be wound.

The member 28 has a cylindrical portion 35 with an inside diameter approximately equal to or slightly smaller than the outside diameter of the flange 31 on the member 27. One end of the cylindrical portion 35 of the member 28 is adapted to receive the flange 31 therein. One end of the cylindrical portion 35 has a radially inwardly directed circumferential flange extending therefrom portions of which have been removed so that it is divided into three equally spaced portions 36, 37 and 38 which form poles in the electric motor and will be referred to as such in the remainder of the specification. The other end of the cylinder 35 has a notch 39 therein adapted to receive a detent 40, which extends outwardly from the outer periphery of the flange 31, to correctly position the poles 32–34 with respect to the poles 36–38. Thus, the member 27 is formed as described and the coil 25 is wound thereon after which the member 28 is press fit onto the member 27 to complete the stator assembly 20. The stator assembly 20' is formed in a similar fashion (and is designated with similar numerals having a prime mark added) and each assembly 20 and 20' is then attached to its respective end plate 11 and 12.

A shaft generally designated 45 is rotatably mounted at approximately the centers of the end plates 11 and 12 by means of bearings 46 and 47 fixedly positioned in the end plates 11 and 12. One end 48 of the shaft 45 terminates in the bearing 46 and the other end 49 of the shaft 45 extends through the bearing 47 and serves as an output shaft for the motor. A radially outwardly extending shoulder 50 adjacent the end 48 butts against the inner end of the bearing 46 and a radially outwardly extending shoulder 51 adjacent the other end 49 of the shaft 45 butts against the inner end of the bearing 47 to prevent axial movement of the shaft 45.

A rotor generally designated 55 is mounted on the shaft 45 by press fitting or the like for rotation therewith. The rotor 55 is generally disk-shaped with a width slightly smaller than the distance between the poles of the stator assemblies 20 and 20' and an outside diameter slightly smaller than the inside diameter of the spacer 21. The rotor 55 is made up of two parts, an inner disk-shaped portion 56, which is press fit onto the shaft 45, and an outer ring-shaped portion 57 having a central opening therein with an inner diameter approximately equal to the outer diameter of the disk-shaped portion 56. The portions 56 and 57 are press fit together to provide a substantially solid rotor. The ring-shaped portion 57 is constructed of a magnetic material which is permanently magnetized to provide 6 oppositely polarized poles alternately positioned therearound. It should be understood that 6 poles are utilized in this embodiment simply for explanatory purposes and any convenient number might be utilized. For purposes of this explanation it will be assumed that the permanently magnetized poles of the ring-shaped portion 57 are substantially wedge-shaped, as illustrated by the broken lines in FIGS. 2 and 3 and the 6 poles are numbered 60–65. Also, to aid in the later explanation the operation of the electric motor the poles 60, 62 and 64 will be designated north magnetic poles while the poles 61, 63 and 65 will be designated south magnetic poles.

A commutator generally designated 70 is attached concentrically to the right surface of the rotor 55 by means of a pair of screws 71. The commutator 70 has a centrally located hole therein through which the shaft 45 extends. The outside diameter of the commutator 70 is somewhat smaller than the inside diameter of the stator assembly 20 so there is no interference therebetween when the rotor 55 is rotating. A brush plate 72 is fixedly attached to the inner surface of the end plate 11 and approximately concentric therewith by screws 73. The brush plate 72 has five brushes 75–79 fixedly attached thereto. The five brushes 75–79 extend inwardly toward the rotor 55 and contacts at the end thereof are in sliding engagement with the commutator 70 as illustrated in FIG. 2. A schematic wiring diagram illustrating the connections of the brushes 75–79 as well as the commutator 70 is illustrated in FIG. 6.

Figure 6:
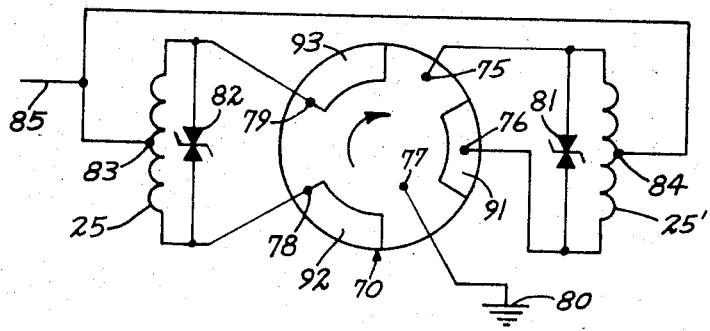
FIG. 6 is a schematic diagram of the electrical circuitry in the electric motor of FIG. 1.

Referring to FIG. 6 the coils 25 and 25' are illustrated schematically and the brushes 75–79 are depicted by dots bearing the same numbers. The brush 75 is connected to one side of the coil 25' while the brush 76 is connected to the other side thereof. The brush 77 is connected to a ground or common connection 80, which may simply be one side of a power supply. The brush 78 is connected to one side of the coil 25 while the brush 79 is connected to the other side of the coil 25. A spark suppression device 81 is connected between the brushes 75 and 76 to prevent arcing of the brushes at the commutator 70 when they move from a conducting to a nonconducting position. The spark suppression device 81 is a semi-conductor device similar to a back-to-back diode which is capable of conducting current in either direction therethrough upon the voltage being applied thereacross reaching a predetermined value. A second spark suppression device 82, which is similar to the spark suppression device 81, is connected between the brushes 78 and 79. In this particular embodiment each of the coils 25 and 25' is center tapped at points designated 83 and 84, respectively. The center tap points 83 and 84 are connected together and attached to one side of a power source by a lead 85.

The surface of the commutator 70 is formed of an electrical conducting material, such as copper or the like, except for three non-conducting segments 91, 92 and 93 adjacent the outer periphery. Each of the segments 91, 92 and 93 is similar in shape and includes approximately 60 arcuate degrees therein. The segments 91, 92 and 93 are spaced apart approximately 60 arcuate degrees so that the outer periphery of the commutator 70 is actually broken up into six alternately conducting and non-conducting segments. The brushes 75, 76, 78 and 79 are positioned adjacent the outer periphery so that they alternately make contact with a conducting and a non-conducting segment as the commutator 70 rotates while the brush 77 is always in sliding contact with the conducting portion of the commutator 70. In addition, the brushes 75 and 76 are positioned approximately 60 arcuate degrees apart and the brushes 78 and 79 are positioned approximately 60 arcuate degrees apart. Also, the brushes 75 and 79 are positioned approximately 90° apart while the brushes 76 and 78 are positioned approximately 150° apart.

Figure 1:
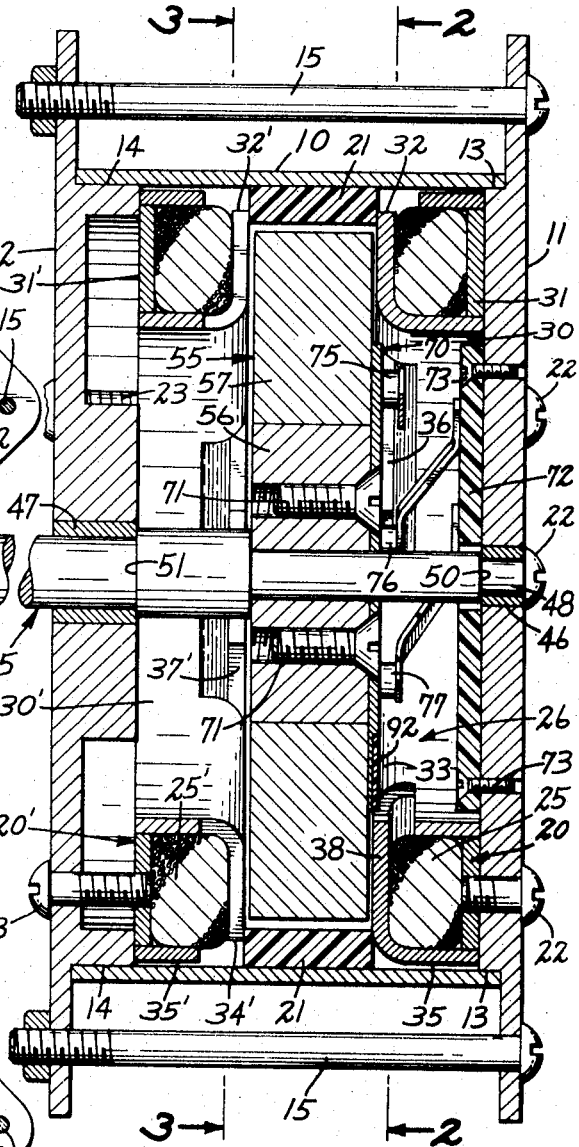
FIG. 1 is an axial sectional view of an embodiment of the present invention.

Referring to FIG. 6 the commutator 70, which is rotating in a clockwise direction, is moving so that the brush 79 is just changing from the non-conducting segment 93 to a conducting segment and the brush 78 is just changing from a conducting segment to the non-conducting segment 92. Thus, the direction of current through the coil 25 associated with the stator assembly 20 will reverse directions. Referring to FIGS. 1 and 2 and assuming that the direction of current in the coil 25 prior to the current reversal therethrough is traveling in a counterclockwise direction, viewing the coil from the right side of FIG. 1, the flux produced by the current in the coil 25 will be traveling from left to right in FIG. 1 in the center of the coil. This flux will produce magnetic poles in the framework 26 with the poles 32, 33 and 34 of the member 27 appearing as south magnetic poles while poles 36, 37 and 38 of the member 28 appear as north magnetic poles. After current reversal through the coil 25 the magnetic flux reverses direction and the poles 32, 33 and 34 will appear as north magnetic poles while the poles 36, 37 and 38 will appear as south magnetic poles.

Referring to FIG. 2 it can be seen that the poles 32, 33 and 34, which were south poles prior to the current switching process, have moved slightly past the north poles 60, 62, 64 of the rotor 55. As the north poles of the rotor 55 move approximately adjacent the south poles of the stator assembly 20 the commutator 70 begins reversal of the current through the coil 25. The reversal requires slight rotation of the rotor 55 so that the south poles of the stator assembly 20 become north poles as the north poles of the rotor 55 become slightly axially misaligned therewith. Thus, the north poles of the stator assembly 20 attract the south poles of the rotor 55 until they are approximately adjacent across the air gap between the rotor 55 and the stator 20 and the torque is approaching a minimum, at which time the brushes 78 and 79 begin the current reversal in the coil 25. It should be noted that the brushes 75–79 have a finite width and, therefore, for a short period of time both of the brushes 78 and 79 are contacting a conducting segment of the commutator 70, as illustrated in FIG. 2. Since both brushes 78 and 79 are contacting a conducting segment of the commutator 70 current is flowing in both directions through different portions of the coil 25, which produces flux in two opposite directions in the framework 26. The two opposite components of flux in the framework 26 have a tendency to cancel each other leaving the poles 32–34 and 36–38 substantially neutral. Since these neutral poles of the stator assembly 20 do not produce a torque on the rotor 55, the rotor 55 moves past the position at which the poles of the rotor 55 and the poles of the stator assembly 20 are directly adjacent, or axially aligned, across the air gap therebetween under its own impetus and the torque produced by the stator assembly 20' on the opposite side thereof. When the rotor 55 moves slightly past the position illustrated in FIGS. 2 and 10 the current in the coil 25 will reverse and the poles 32, 33 and 34 of the stator assembly 20 will become north magnetic poles while the poles 36, 37 and 38 will become south magnetic poles.

Figure 10:
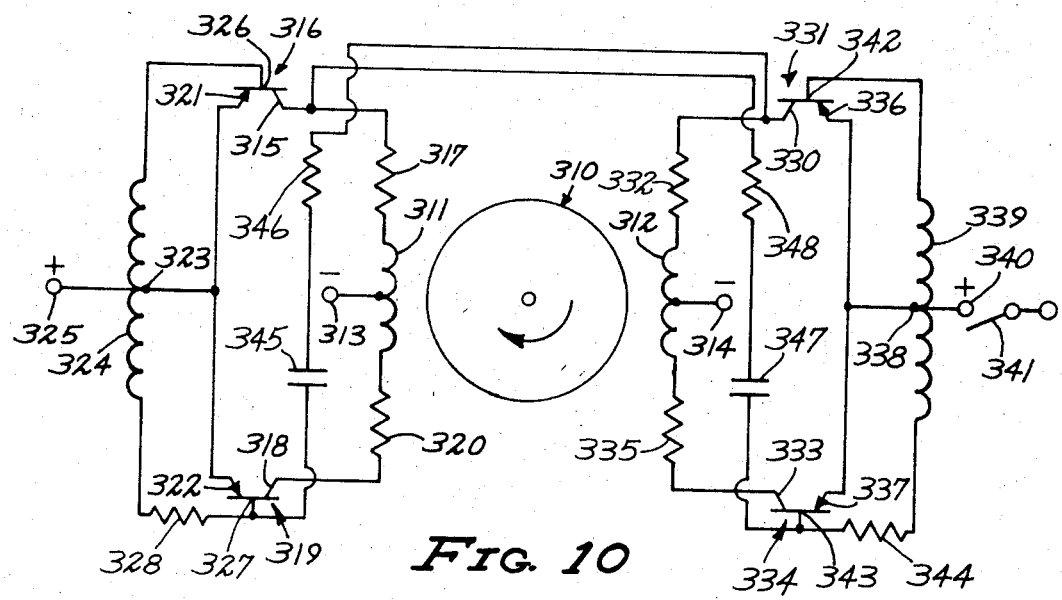
FIG. 10 is a schematic diagram of a different embodiment for commutation of the electricity to the electric motor.

Referring to FIGS. 3 and 10 it can be seen that while the current is being reversed through the coil 25 of the stator assembly 20, the brushes 75 and 76 connected to the coil 25' of the stator assembly 20' are in the center of a conducting segment and the non-conducting segment 91, respectively. It should also be noted that the stator assembly 25' is displaced from the stator assembly 25 about the axis thereof approximately 30° or one-half magnetic pole. At the instant of time portrayed in FIGS. 2 and 10 the magnetic poles of the rotor 55 and the magnetic poles of the stator assembly 20' are displaced from each other about their axis approximately a maximum distance, which is one-half pole or 30°. The operating torque on the rotor 55 is substantially uniform since the torque produced by one stator assembly is substantially maximum while the torque produced by the other stator assembly is zero and vice versa.

Figure 7:
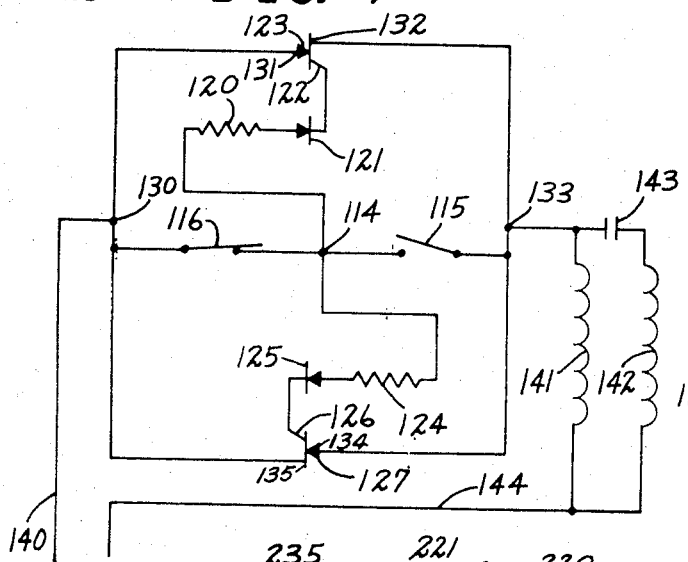
FIGS. 7 and 8 illustrate a schematic diagram and commutator associated therewith in a somewhat different embodiment of the present invention.
Figure 8:
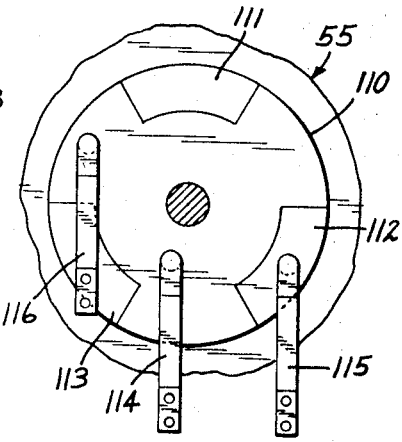

FIGS. 7 and 8 illustrate a different embodiment of the present invention in which the commutation and electrical connections are altered to allow the use of an alternating current source of electricity. In FIG. 8 a commutator designated 110 is constructed of electrically conducting material except for three arcuate segments 111, 112 and 113 spaced at 60° intervals as described in conjunction with commutator 70. Three brushes 114, 115 and 116 are positioned in sliding contact with the surface of the commutator 110. The brush 114 is always in contact with the conducting surface while the brushes 115 and 116 are placed 180° apart so that when one is in contact with the conducting surface the other is in contact with one of the non-conducting segments 111, 112 or 113. Thus, two of the brushes 114, 115 and 116 are always electrically connected together.

Referring to FIG. 7 the brush 114 is illustrated as a junction point, also designated 114, while the brushes 115 and 116 are illustrated as switches each having a movable and a stationary contact. The stationary contacts of each of the switches 115 and 116 are directly connected to the junction point 114 (through the commutator 110). The junction point 114 is connected through a resistor 120 and a diode 121 in series to a gate 122 of an SCR 123. The junction point 114 is also connected through a second resistor 124 and a diode 125 in series therewith to a gate 126 of a second SCR 127. It should be understood that the SCR's 123 and 127 are current switching devices and other devices, such as relays or the like, might be utilized and still be within the scope of this invention. The SCR 123 has an anode 131, which is connected to a junction point 130 and a cathode 132, which is connected to a junction point 133. The SCR 127 has an anode 134 which is connected to the junction point 133 and a cathode 135 which is connected to the junction point 130. The movable contact of the switch 116 is also connected to the junction point 130 and the movable contact of the switch 115 is connected to the junction point 133. The junction point 130 has a lead 140 attached thereto which is adapted to be attached to one side of a suitable source of power, such as 120 volt 60 cycle line. A pair of coils 141 and 142 are similar to the coils 25 and 25' in the previously described embodiment except that the coils 141 and 142 are not center tapped. The coil 142 has a capacitor 143 in series therewith and the combination is connected in parallel with the coil 141. One end of the coil 141 is connected to the junction point 133 and the other end has a lead 144 connected thereto which is adapted to be connected to the other side of the source of power.

In the operation of this embodiment when one of the switches 115 or 116 is closed, that is to say one of the brushes 115 or 116 is in engagement with the conducting portion of the commutator 110, the correct polarity of voltage is applied to the gates 122 and 126 of the SCR's 123 and 127 to cause one of the SCR's 123 or 127 to conduct. For example, in FIG. 7 the switch 116 is closed, assuming the lead 140 is positive at this particular instant, the anode 131 of the SCR 123 is positive while a positive voltage is applied to the gate 122 through the switch 116, the resistor 120 and the diode 121. Thus, the SCR 123 conducts and a current path is completed from the lead 140 through the SCR 123, the coil 141 and the capacitor 143 and coil 142 to the lead 144 which is connected to the other side of the power source. Since the coil 142 has the capacitor 143 in series therewith, the current passing therethrough will lead the current passing through the coil 141 somewhat in phase. Thus, the phase difference which was introduced into the coils 25 and 25' of the previously described embodiment by the position of the brushes 75–79 is introduced into the present embodiment electrically.

As the rotor of the motor rotates and moves the commutator 110 the switch 116 will eventually open and the switch 115 will close. At this particular instant of time assuming the lead 144 is positive with respect to the lead 140, a positive voltage will be supplied to the anode 134 of the SCR 127 while a positive voltage is supplied to the gate 126 through the switch 115, the resistor 124 and the diode 125. Thus, the SCR 127 will conduct completing a circuit from the lead 144 through the coil 141 and the coil 142 and capacitor 143 to the lead 140. It should be noted that this current is passing through the coils 141 and 142 in the opposite direction, thus, changing the flux produced by the coils and the polarity of the poles in the stator assemblies. It should also be noted that as the motor of this embodiment is first started it is in effect operating on pulsating D.C. since the electronic circuit serves to rectify the voltage applied to the SCR's 123 and 127. However as the motor increases in speed it will eventually synchronize itself with the alternations of the voltage being applied to the leads 140 and 144. An additional advantage of this particular embodiment lies in the fact that the entire stator coil 141 or 142 is being utilized, rather than only one-half of the coil as in the previous embodiment.

Figure 9:
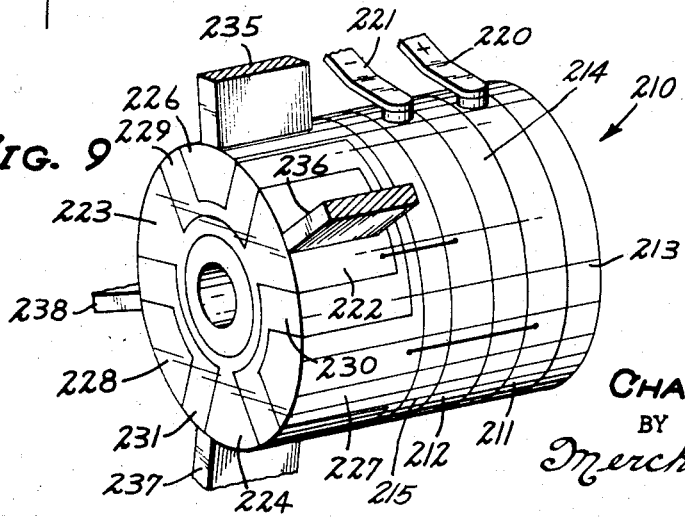
FIG. 9 illustrates another embodiment of a commutator for the electric motor.

FIG. 9 illustrates a further embodiment of a commutator generally designated 210 that may be utilized in conjunction with the above-described electric motor and a D.C. power source. The commutator 210 is constructed in a generally drum-like shape and has a pair of circumferentially disposed slip rings 211 and 212 adjacent one end thereof. The slip rings 211 and 212 are bounded on either side by three circumferential portions of non-producting material designated 213, 214 and 215. The slip ring 211 has a brush 220 mounted in sliding engagement therewith, which brush 220 is connected to the positive output of a D.C. power supply. The slip ring 212 has a brush 221 in sliding engagement therewith which brush 221 is connected to the negative source of the power supply. The voltage applied to brushes 220 and 221 can be interchanged and the assembly will operate properly. The remaining surface of the commutator 210 is divided into three portions 222, 223 and 224, which are connected mechanically together and to the slip ring 212, three portions 226, 227 and 228, which are mechanically connected together and to the slip ring 211, and three portions 229, 230 and 231 which surround the portions 226, 227 and 228 to insulate them from the portions 222, 223 and 224.

Four brushes 235, 236, 237 and 238 are in sliding engagement with the outer periphery of the cylindrically shaped commutator 210 and extend axially therealong a substantial distance. The brushes 235–238 have a rectangular-shaped sliding surface in engagement with the outer periphery of the commutator 210 and because of their width and extensive axial length have a greatly increased life expectancy. In this embodiment the brushes 235–238 are adapted to have the stator coils connected directly therebetween. The brushes 235 and 236 are positioned so that they have applied thereto either opposite voltages or no voltage at all. In a similar fashion the brushes 237 and 238 are positioned so that they are always of opposite voltage or no voltage at all. In addition, the brushes 237 and 238 are positioned relative to the brushes 235 and 236 so that they are each in the middle of a conducting portion of the commutator 213 when the brushes 235 and 236 are centered on a non-conducting portion and vice versa. Thus, an advantage of utilizing the commutator of this embodiment is that the brushes are extremely large to provide them with long life and in addition the entire stator coil is utilized, rather than one-half as described in the first embodiment.

Another embodiment of a means for energizing the previously described electric motor is illustrated schematically in FIG. 10. In FIG. 10 the rotor is designated 310 and the stator coils are designated 311 and 312. In this embodiment each of the stator coils 311 and 312 is center tapped and have terminals 313 and 314, respectively, attached thereto. The terminals 313 and 314 are adapted to be connected together and to the negative terminal of a DC power supply. One side of the coil 311 is connected to a collector 315 of a transistor 316 through a resistor 317. The opposite side of the coil 311 is connected to a collector 318 of a transistor 319 through a resistor 320. Each of the transistors 316 and 319 have an emitter 321 and 322, respectively, which are connected together and attached to a center tap 323 of a pick-up coil 324. The center tap 323 of the pick-up coil 324 also has a terminal 325, which is adapted to be connected to the positive side of the DC power supply, in a manner to be described presently. A base 326 of the transistor 316 is attached to one side of the coil 324 while a base 327 of the transistor 319 is attached to the other side of the coil 324 through a resistor 328. One side of the coil 312 is connected to a collector 330 of a transistor 331 through a resistor 332. The other side of the coil 312 is connected to a collector 333 of a transistor 334 through a resistor 335. An emitter 336 of the transistor 331 and an emitter 337 of the transistor 334 are connected together and to a center tap 338 of a pick-up coil 339. The center tap 338 of the pick-up coil 339 is also connected to a terminal 340 which is in turn connected to a terminal of a manual on/off switch 341. The opposite terminal of the switch 341 is adapted to be connected to the positive side of a DC power supply. The terminal 325 is connected (not shown) to the terminal 340 and thence to the positive side of the DC power supply through the switch 341. One side of the pick-up coil 339 is connected to a base 342 of the transistor 331 while the other side of the pick-up coil 339 is connected to a base 343 of the transistor 334 through a resistor 344. The base 327 of the transistor 319 is also connected to the collector 330 of the transistor 331 through a capacitor 345 and a resistor 346. The base 343 of the transistor 334 is connected to the collector 315 of the transistor 316 through a capacitor 347 and a resistor 348. While all four transistors 316, 319, 331 and 334 are illustrated as P-N-P types, it should be understood that other semiconductor devices might be utilized with minor alterations in the circuitry which would be within the scope of this invention.

In the embodiment illustrated in FIG. 10 the terminals 325 and 340 are positive and the terminals 313 and 314 are negative. Also, the pick-up coils 324 and 339 are situated relative to the rotor 310 so that movement of the rotor 310 past the coils 324 and 339 induces a voltage therein. The rotor 310 in the present embodiment is similar to the rotor 55 in the first embodiment in that it has a plurality of oppositely polarized poles therein. Since the magnetic poles of the rotor 310 alternate in polarity the voltage induced into each of the pick-up coils 324 and 339 will alternate in polarity and will appear as a substantially sinusoidal voltage alternating at the rate of three cycles per revolution of the rotor 310 (assuming six poles on the rotor 310 as illustrated in FIGS. 2 and 3). In addition, the coils 324 and 339 are situated relative to the rotor 310 so that the phase of the voltages induced therein is approximately 90 electrical degrees apart. That is, when the voltage across coil 324 is at a peak the voltage across the coil 339 is changing polarity and vice versa. It should be understood that the present embodiment is a device for electronically controlling the motor already described in conjunction with FIGS. 1–5 and the coils 311 and 312 are similar to the coils 25 and 25'. Also, while there is no apparatus for including the coils 324 and 339 in the motor illustrated in FIG. 1, it should be understood that pick-up coils of this type are well known in the art and provisions for these coils could be included if this embodiment is desired.

In the operation of the embodiment illustrated in FIG. 10 assume that the voltage across the coil 324 is such that the base 326 of the transistor 316 is maximum positive and the base 327 of the transistor 319 is maximum negative. At this time the base 342 of the transistor 331 and the base 343 of the transistor 334 are substantially zero and the transistors 331 and 334 are non-conducting. Also, since the base 326 of the transistor 316 is positive that transistor is non-conducting. Thus, only the transistor 319 is conducting and current flows from the positive terminal 325 through the transistor 319, the resistor 320 and one-half of the coil 311 to the negative terminal 313. As the rotor 310 turns slightly a voltage is induced into the coil 339 such that the base 343 of the transistor 334 is positive and the base 342 of the transistor 331 is negative. Thus, transistor 331 conducts and current flows from the positive terminal 341 through the transistor 331, the resistor 332 and one-half of the coil 312 to the negative terminal 314. Further rotation of the rotor 310 will cause a voltage to be induced into the coil 324 which will turn off the transistor 319 and turn on the transistor 316. As the rotor 310 continues to rotate the transistor 331 will turn off and the transistor 334 will turn on. Thus, effective communication or switching is accomplished electronically rather than mechanically.

Figure 11:
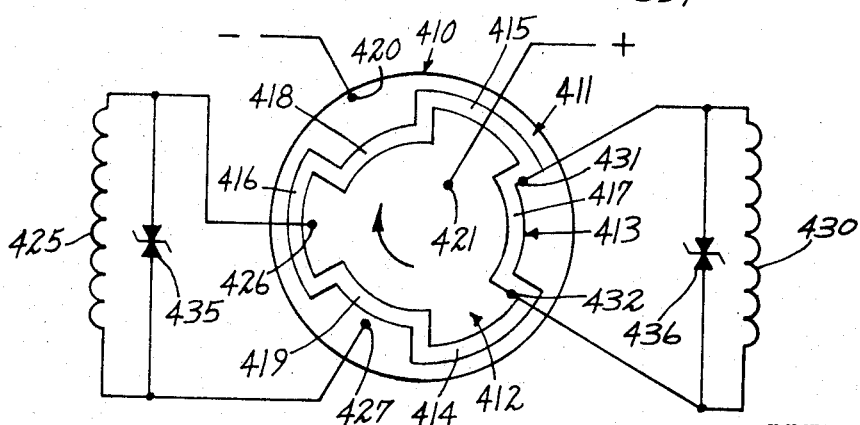
FIG. 11 is a somewhat schematic drawing of a further embodiment for a commutator to be used with the electric motor.

In a still further embodiment illustrated in FIG. 11 the commutation is accomplished mechanically but the entire stator coil is utilized to produce torque on the rotor. In FIG. 11 a commutator 410 is attached in some convenient manner to the rotor of the motor previously described. The commutator 410 includes an outer conducting portion 411 and an inner conducting portion 412 separated from the portion 411 by a non-conducting strip 413. The non-conducting strip 413 is composed of three arcuate segments 414, 415, and 416 each of which is approximately 60° long and is separated by approximately 60° and three arcuate segments 417, 418 and 419 each of which is approximately 60° long. The three segments 417, 418 and 419 are disposed alternately between the segments 414, 415 and 416 but are positioned radially inwardly toward the center of the commutator 410. The ends of all of the segments 414–419 are connected together by short segments of radii which extend from the end of the inner segments to the end of the outer segments.

A brush 420, which is connected to one side of a suitable power source, is positioned in sliding engagement with the surface of the commutator 410 and maintains the outer portion 411 at a constant polarity. A second brush 421, which is connected to the other side of the power source, is in sliding engagement with the surface of the commutator 410 and maintains the inner portion 412 at a constant and opposite polarity to that of the portion 411. One end of a coil 425 is connected to a brush 426 which is in sliding engagement with the surface of the commutator 410 and which alternately slides from the conducting portion 412 through one of the segments of a radius in the non-conducting strip 413 to the conducting portion 411 on the other side. The other end of the coil 425 is connected to a brush 427 which is in sliding engagement with the surface of the commutator 410 and positioned 60° from the brush 426 at approximately the same distance from the center of the commutator 410. Thus, when the brush 426 is in contact with the conducting portion 412, the brush 427 is in contact with the conducting portion 411 and both of the brushes 426 and 427 pass through non-conducting segments of radii together to change polarity.

One end of a second coil 430 is connected to a brush 431 which is in sliding engagement with the surface of the commutator 410 and positioned approximately the same distance from the center thereof as the brush 426 but approximately 150° in a clockwise direction therefrom. The other end of the coil 430 is connected to a brush 432 which is in sliding engagement with the surface of the commutator 410 and positioned approximately the same distance from the center thereof as the brush 431 but approximately 60° in a clockwise direction therefrom. Thus, the two brushes 431 and 432 both pass through non-conducting radii at the same time and alternate in polarity. It should be noted that the brushes 426 and 427 are displaced 30° relative to the brushes 431 and 432 so that one of the coils 425 or 430 is conducting when the polarity of the other coil is being reversed. A spark suppression device 435 is connected across the coil 425 and a spark suppression device 436 is connected across the coil 430 to prevent arcing at the commutator 410. The spark suppression devices 435 and 436 are similar to the devices 81 and 82 described in conjunction with FIG. 6.

Thus, an electric motor has been described having stator assemblies positioned so as to provide axial air gaps between the stator and the rotor as opposed to the conventional radial air gaps. Because of the novel stator a great variety of energizing devices can be utilized and the motor can be adapted to a variety of power sources. Also, because of the novel stator the motor is extremely simple to construct and relatively inexpensive.

While I have shown and described specific embodiments of this invention, further modifications and improvements will occur to those skilled in the art. I desire it to be understood, therefore, that this invention is not limited to the particular forms shown and I intend in the appended claims to cover all modifications which do not depart from the spirit and scope of this invention.

What is claimed is:
1. An electric motor comprising:
   (a) a magnetized rotor having a plurality of oppositely polarized poles thereon;
   (b) a first framework of magnetic material having a first coil of wire disposed therein, said first framework being constructed so that one axially directed surface is formed of a plurality of oppositely polarized magnetic poles upon connection of said first coil to a suitable source of electricity;
   (c) a second framework of magnetic material having a second coil of wire disposed therein, said second framework being constructed so as to provide a plurality of oppositely polarized magnetic poles upon connection of said second coil to a suitable source of electricity;
   (d) means mounting said first and second framework in juxtaposition to said rotor so that the magnetic poles of said first and second framework are adjacent the poles of said rotor and spaced axially therefrom to provide axial air gaps therebetween and the poles of said first framework are displaced from the poles of said second framework about the axis of said rotor a predetermined amount; and
   (e) switching means connected to said first and second coils and adapted to be connected to a suitable source of electricity for sequentially connecting said first and second coils to said source of electricity.

2. An electric motor as set forth in claim 1 wherein the rotor is a disk shaped permanent magnet having a plurality of oppositely polarized poles alternately positioned adjacent the periphery.

3. An electric motor as set forth in claim 1 wherein the switching means includes a commutator attached to the rotor for rotation therewith and the source of electricity is an alternating current supply.

4. An electric motor as set forth in claim 1 wherein the first and second framework are substantially similar each having a generally hollow toroidal shape with the side adjacent the rotor having a plurality of alternately polarized poles formed therein and the associated coil coaxially positioned on the inside.

5. An electric motor as set forth in claim 4 wherein the first framework is positioned adjacent one side of the rotor coaxial therewith and the second framework is positioned adjacent the other side of said rotor coaxial therewith so that the poles of the first and second frameworks are adjacent the poles of said rotor.

6. An electric motor as set forth in claim 1 wherein the switching means includes a commutator and brushes operatively connected to the rotor and a pair of current switching devices, said current switching devices being controlled by current passing through said commutator and said current switching devices controlling the current passing through the coils of the motor.

7. An electric motor as set forth in claim 1 wherein the switching means includes inductive means operatively associated with said rotor for having an alternating voltage induced therein during rotation of said rotor and a plurality of current switching devices, said current switching devices being controlled by the voltage induced in said inductive means and said current switching devices controlling the current passing through the coils of the motor.

8. An electric motor comprising:
   (a) a magnetized rotor having a plurality of oppositely polarized poles thereon fixedly positioned with respect thereto:
   (b) a first generally toroidal shaped framework of magnetic material having a first generally toroidal shaped coil of wire disposed therein, said first framework being constructed so as to provide a plurality of oppositely polarized magnetic poles upon connection of said first coil to a suitable source of electricity;
   (c) a second generally toroidal shaped framework of magnetic material having a second generally toroidal shaped coil of wire disposed therein, said second framework being constructed so as to provide a plurality of oppositely polarized magnetic poles upon connection of said second coil to a suitable source of electricity;
   (d) means coaxially mounting said first and second framework about the axis of said rotor and in juxtaposition thereto so that the magnetic poles of said first and second framework are axially displaced from the poles of said rotor and the poles of said first framework are displaced from the poles of said second framework about the axis of said rotor a predetermined amount; and (e) switching means connected to said first and second coils and adapted to be connected to a suitable source of electricity for sequentially connecting said first and second coils to said source of electricity.

References Cited

UNITED STATES PATENTS

| | | | |
|---|---|---|---|
| 2,070,447 | 2/1937 | Morrill | 310—164 |
| 2,814,746 | 11/1957 | Boerdijk | 310—164 |
| 3,165,685 | 1/1965 | Manteuffel et al. | 318—138 |
| 3,229,137 | 1/1966 | McCarty | 310—268 |
| 3,229,179 | 1/1966 | Hetzel | 318—138 |
| 3,238,399 | 3/1966 | Croymans et al. | 310—46 |
| 3,290,572 | 12/1966 | Hartmann et al. | 318—138 |

WARREN E. RAY, *Primary Examiner.*

U.S. Cl. X.R.

310—156, 233, 257, 268